(12) United States Patent
Takatori et al.

(10) Patent No.: US 7,861,264 B2
(45) Date of Patent: Dec. 28, 2010

(54) TELEVISION RECEIVER AND SYSTEM INCLUDING THE SAME

(75) Inventors: Masahiro Takatori, Toyonaka (JP);
Hirofumi Wada, Toyonaka (JP);
Mitsuteru Kataoka, Katano (JP)

(73) Assignee: Panasonic Corporation, Osaka (JP)

( * ) Notice: Subject to any disclaimer, the term of this patent is extended or adjusted under 35 U.S.C. 154(b) by 954 days.

(21) Appl. No.: 10/505,572

(22) PCT Filed: Jun. 18, 2003

(86) PCT No.: PCT/JP03/07705
§ 371 (c)(1),
(2), (4) Date: Aug. 25, 2004

(87) PCT Pub. No.: WO04/002139
PCT Pub. Date: Dec. 31, 2003

(65) Prior Publication Data
US 2005/0166228 A1 Jul. 28, 2005

(30) Foreign Application Priority Data
Jun. 19, 2002 (JP) .............................. 2002-178110

(51) Int. Cl.
*G04F 3/00* (2006.01)
*G04F 13/00* (2006.01)
*H04N 5/445* (2006.01)

(52) U.S. Cl. ............................. 725/40; 725/43; 725/51; 725/109; 725/110

(58) Field of Classification Search .................. 725/40, 725/43, 51, 109, 110
See application file for complete search history.

(56) References Cited

U.S. PATENT DOCUMENTS

| | | | | | |
|---|---|---|---|---|---|
| 6,005,565 | A | * | 12/1999 | Legall et al. | 715/721 |
| 6,025,837 | A | * | 2/2000 | Matthews et al. | 715/721 |
| 6,177,931 | B1 | * | 1/2001 | Alexander et al. | 725/52 |
| 6,732,369 | B1 | * | 5/2004 | Schein et al. | 725/39 |
| 7,269,838 | B1 | * | 9/2007 | Boyer et al. | 725/51 |
| 2001/0052133 | A1 | * | 12/2001 | Pack et al. | 725/109 |
| 2003/0051252 | A1 | * | 3/2003 | Miyaoku et al. | 725/109 |
| 2004/0107439 | A1 | * | 6/2004 | Hassell et al. | 725/44 |
| 2005/0015801 | A1 | * | 1/2005 | Hososda et al. | 725/38 |
| 2006/0259935 | A1 | * | 11/2006 | Fries | 725/112 |
| 2007/0136748 | A1 | * | 6/2007 | Rodriguez et al. | 725/37 |

FOREIGN PATENT DOCUMENTS

| | | |
|---|---|---|
| JP | 9-160852 | 6/1997 |
| JP | 9-274554 | 10/1997 |
| JP | 10-177532 | 6/1998 |
| JP | 11-069317 | 3/1999 |
| JP | 11-134345 | 5/1999 |
| JP | 2002-24250 | 1/2002 |
| JP | 2002-354445 | 12/2002 |

* cited by examiner

*Primary Examiner*—Christopher Kelley
*Assistant Examiner*—Charles N Hicks
(74) *Attorney, Agent, or Firm*—Wenderoth, Lind & Ponack, L.L.P.

(57) ABSTRACT

A television receiver (1) acquires numerical quantity information from program list information acquired from a television signal or the like, the acquired numerical quantity indicates the number of program-related information related to a television program and (2) displays the acquired numerical quantity information on a television display screen. When a user selects a television program whose program-related information is to be acquired, the television receiver acquires a URL of program-related information from an address server by utilizing the program identification code of the selected television program, acquires the program-related information from an information server by utilizing the acquired URL, and displays the acquired program-related information so as to be superimposed on a television picture.

18 Claims, 13 Drawing Sheets

| | .... | BS201<br>A BROADCASTER | BS202<br>B BROADCASTER | .... |
|---|---|---|---|---|
| ⋮ | ⋮ | ⋮ | ⋮ | ⋮ |
| 19:00 | .... | 00<br>TITLE:SOCCER<br>PCODE:02456789<br>INFNO:0 | 00<br>TITLE:DISHES OF THE SEASON<br>PCODE:35678349<br>INFNO:3 | .... |
| 20:00 | .... | 00<br>TITLE:DRAMA<br>PCODE:98765<br>INFNO:1 | 00<br>TITLE:NEWS<br>PCODE:8769<br>INFNO:0 | .... |
| ⋮ | ⋮ | ⋮ | ⋮ | ⋮ |

F I G. 1
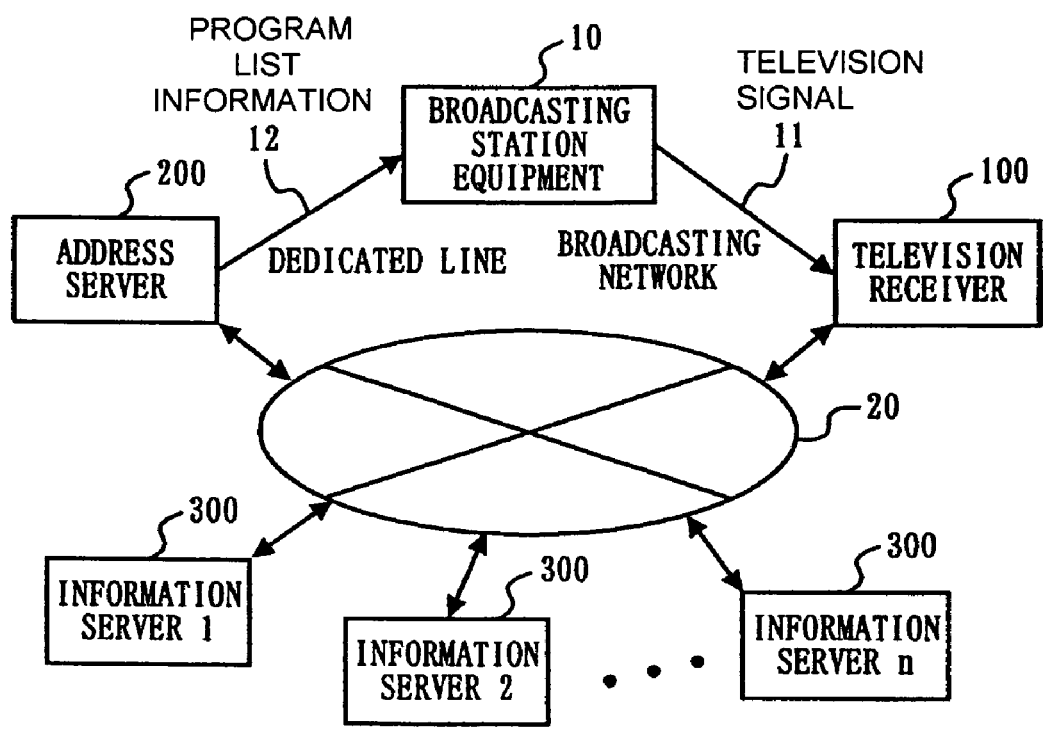

FIG. 3

| | BS201<br>A BROADCASTER | BS202<br>B BROADCASTER | ... |
|---|---|---|---|
| .... | .... | .... | .... |
| 19:00 | 00<br>TITLE: SOCCER<br>PCODE: 02456789<br>INFNO: 0 | 00<br>TITLE: DISHES OF THE SEASON<br>PCODE: 35678349<br>INFNO: 3 | ... |
| 20:00 | 00<br>TITLE: DRAMA<br>PCODE: 98765<br>INFNO: 1 | 00<br>TITLE: NEWS<br>PCODE: 8769<br>INFNO: 0 | ... |
| .... | .... | .... | .... |

| PROGRAM IDENTIFICATION CODE | URL OF PROGRAM-RELATED INFORMATION | TITLE OF PROGRAM-RELATED INFORMATION |
|---|---|---|
| 98765 | http://www.asdfgh.co.jp | DRAMA SPECIAL |
| 34678349 | http://www.abcdefg.co.jp | COOKING RECIPE |
| 34678349 | http://www.xyz.com | RESTAURANT MAP |
| 34678349 | http://www.123456789.co.jp | GUIDE TO TABLEWARE |

F I G. 9

| URL OF PROGRAM-RELATED INFORMATION | TITLE OF PROGRAM-RELATED INFORMATION |
|---|---|
| http://www.abcdefg.co.jp | COOKING RECIPE |
| http://www.xyz.com | RESTAURANT MAP |
| http://www.123456789.co.jp | GUIDE TO TABLEWARE |

TELEVISION RECEIVER AND SYSTEM INCLUDING THE SAME

BACKGROUND OF THE INVENTION

1. Field of the Invention

The present invention relates to a device having a television broadcast receiving function, such as a digital television receiver, a personal computer, and a mobile phone, and to a system for providing information to a device having a television broadcast receiving function.

2. Background of the Related Art

As one method for easily selecting a television program to be recorded when conducting a preprogrammed recording of a television program, a method which utilizes G-code® is known. A G-code® is a kind of program identification information which makes it possible to uniquely identify a program, and is a code represented by a number of eight digits or less. The eight digits or less are obtained by compressing and encoding a date, a channel, a start time of a program, and a length of the program, which are required to conduct a preprogrammed recording.

The application of G-code® is, at present, almost limited to preprogrammed recording in a video device. As another application, Japanese Laid-Open Patent Publication No. 2002-354445 discloses an information providing system for providing program-related information related to a television program, utilizing G-code®.

FIG. 17 is a diagram illustrating the structure of the information providing system disclosed in the above publication. In the system illustrated in FIG. 17, a terminal device 1701 for a user, a terminal device 1702 for an information provider, and administration equipment 1703 are interconnected via a communication network 1704. The information provider associates program identification information such as G-code® with program-related information to be provided to a user, and inputs them to the terminal device 1702 for an information provider. The inputted program identification information and program-related information are transmitted from the terminal device 1702 for an information provider to the administration equipment 1703 and accumulated in a database in the administration equipment 1703, while maintaining the association.

When a user desires to acquire program-related information related to a certain television program, he or she inputs the program identification information of the television program to the terminal device 1701. The inputted program identification information is transmitted from the terminal device 1701 to the administration equipment 1703. When the administration equipment 1703 receives the program identification information, it reads program-related information corresponding to the received program identification information from the database and transmits the read program-related information to the terminal device 1701. The terminal device 1701 displays, on a display screen, the program-related information received from the administration equipment 1703. Thus, the user can be provided with the program-related information related to the television program.

However, the above-described conventional system for providing information has the following problems. First, in this system, it is necessary for a user to input program identification information such as G-code®, while referring to a program list which is published in a newspaper, a magazine, and/or the like. Because of this, this system has a problem of obliging a user to carry out a troublesome operation. Moreover, this system has a problem in that it is necessary to additionally provide administration equipment which associates program identification information with program-related information and stores them. Furthermore, this system has a problem in that the user cannot see whether or not any program-related information corresponding to the program identification information exists until he or she inputs the program identification information and receives a result transmitted from the administration equipment.

Therefore, an object of the present invention is to (i) provide a television receiver which allows a user to easily select a television program whose program-related information is to be acquired, and (ii) allow the user to know whether any program-related information related to the television program exists or not before selecting the television program, and a system including the same.

BRIEF DESCRIPTION OF THE INVENTION

To achieve the object as described above, the present invention has the following aspects.

A first aspect is directed to a television receiver which receives a television signal and acquires information via a communication network, the television receiver comprising: a television broadcast receiving section for obtaining a television picture based on the television signal and displaying the obtained television picture on a television display screen; a numerical quantity acquisition section for acquiring a numerical quantity of program-related information related to a television program from program list information which has been acquired; a numerical quantity display section for displaying the numerical quantity acquired by the numerical quantity acquisition section on the television display screen; an input section for inputting an instruction from a user; an information acquisition section for acquiring, via the communication network, program-related information related to a television program selected by using the input section; and an information display section for displaying, on the television display screen, the program-related information acquired by the information acquisition section.

According to the first aspect, since the numerical quantity of program-related information related to a television program is displayed on a television display screen, a user can recognize whether any program-related information related to the television program exists, before selecting the television program. As a result, the user can efficiently select a television program whose program-related information is to be acquired.

In a second aspect based on the first aspect, the numerical quantity acquisition section acquires the program list information from the television signal or via the communication network and acquires the numerical quantity with respect to each television program contained in the program list information.

According to the second aspect, by acquiring program list information including the numerical quantity of program-related information, the numerical quantity of the program-related information can be acquired together.

In a third aspect based on the second aspect, the numerical quantity display section makes a program list in which each television program contained in the program list information is shown in a manner corresponding to the numerical quantity acquired by the numerical quantity acquisition section and displays the made program list on the television display screen.

According to the third aspect, in a program list displayed on a television display screen, each television program is shown in a manner corresponding to the numerical quantity of program-related information. As a result, a user can easily recognize whether any program-related information related to a television program exists.

In a fourth aspect based on the second aspect, the numerical quantity display section makes, based on the program list information, a program list including the numerical quantity acquired by the numerical quantity acquisition section and displays the made program list on the television display screen.

According to the fourth aspect, since the numerical quantity of program-related information is displayed, on a television display screen, so as to be associated with a program list, a user can easily recognize whether any program-related information related to a television program exists. Moreover, by selecting a television program whose program-related information is to be acquired by utilizing a program list displayed on a television display screen, a user can acquire program-related information related to a television program which is not currently being viewed.

In a fifth aspect based on the fourth aspect, the numerical quantity display section displays on the television display screen a program content screen including the numerical quantity acquired by the numerical quantity acquisition section together with the television picture having been reduced in size.

According to the fifth aspect, since the numerical quantity of program-related information is displayed together with a television picture reduced in size, a user can recognize whether any program-related information related to a television program which is currently being viewed exists, while watching the television program.

In a sixth aspect based on the first aspect, the numerical quantity acquisition section acquires the numerical quantity with respect to a television program which is being displayed as the television picture.

According to the sixth aspect, after recognizing whether any program-related information, related to a television program which is currently being viewed, exists, a user can give an instruction to acquire the program-related information.

In a seventh aspect based on the sixth aspect, the numerical quantity display section displays a banner corresponding to the numerical quantity acquired by the numerical quantity acquisition section so as to be superimposed on the television picture.

According to the seventh aspect, since a banner corresponding to the numerical quantity of program-related information is displayed on a television display screen, a user can easily recognize whether any program-related information of a television program which is currently being viewed exists.

In an eighth aspect based on the sixth aspect, the numerical quantity display section displays, on the television display screen, a program content screen including the numerical quantity acquired by the numerical quantity acquisition section together with the television picture having a reduced size.

According to the eighth aspect, since the numerical quantity of program-related information is displayed together with a television picture that is reduced in size, a user can recognize whether any program-related information, related to a television program which is currently being viewed, exists, while watching the television program.

A ninth aspect, based on the first aspect, further includes a program identification information acquisition section for acquiring, from the program list information, program identification information for uniquely identifying a television program. In addition, according to the ninth aspect of the invention, the information acquisition section acquires desired program-related information, via the communication network, by utilizing the program identification information acquired by the program identification information acquisition section.

According to the ninth aspect, since access to an information server is made by utilizing program identification information instead of the address information of program-related information, the amount of data of program list information can be reduced.

In a tenth aspect based on the ninth aspect, the information acquisition section acquires desired program-related information by accessing, by utilizing the program identification information acquired by the program identification information acquisition section, an information server which is connected therewith so as to be capable of communication and in which program identification information and program-related information are accumulated in association with each other.

According to the tenth aspect, since program identification information and program-related information are accumulated in an information server so as to be associated with each other, a television receiver can acquire program-related information from an information server by utilizing program identification information.

In an eleventh aspect based on the ninth aspect, the information acquisition section acquires desired program-related information by: accessing, by utilizing the program identification information acquired by the program identification information acquisition section, an address server connected thereto so as to be capable of communication and in which program identification information and address information of program-related information are accumulated in association with each other; and accessing, by utilizing the address information of the program-related information acquired from the address server, an information server connected thereto so as to be capable of communication and in which program-related information and address information of the program-related information are accumulated in association with each other.

According to the eleventh aspect, since program identification information and the address information of program-related information are accumulated in an address server so as to be associated with each other, even in the case where an existing information server itself is employed, a television receiver can acquire program-related information from an information server by utilizing program identification information.

In a twelfth aspect based on the eleventh aspect, the information display section displays, on the television display screen, the address information of the program-related information acquired from the address server before the information acquisition section accesses the information server.

According to the twelfth aspect, a user can select program-related information which he or she wants to acquire, after checking the address information of the program-related information displayed on a television display screen.

In a thirteenth aspect based on the ninth aspect, the program identification information is encoded information including (i) a channel and (ii) a date and time, on or at which a television program is broadcast.

According to the thirteenth aspect, it is possible to uniquely identify a television program correctly.

In a fourteenth aspect based on the thirteenth aspect, the program identification information is a G-code®.

According to the fourteenth aspect, it is possible to uniquely identify a television program correctly by employing an existing technique.

In a fifteenth aspect based on the ninth aspect, the program identification information is encoded information including (i) a broadcasting station and (ii) a date and time, from or at which a television program is broadcast.

According to the fifteenth aspect, it is possible to uniquely identify a television program correctly with high accuracy.

A sixteenth aspect is directed to a system in which information is provided from an information server to a television receiver, comprising a television receiver and an information server which are interconnected therebetween so as to be capable of communicating with each other. The television receiver comprises: a television broadcast receiving section for obtaining a television picture based on a received television signal and displaying the obtained television picture on a television display screen; a numerical quantity acquisition section for acquiring a numerical quantity of program-related information related to a television program from program list information which has been acquired; a program identification information acquisition section for acquiring, from the program list information, program identification information for uniquely identifying a television program; a numerical quantity display section for displaying the numerical quantity acquired by the numerical quantity acquisition section on the television display screen; an input section for inputting an instruction from a user; an information acquisition section for acquiring program-related information related to a television program selected by using the input section from the information server; and an information display section for displaying the program-related information acquired by the information acquisition section on the television display screen, and the information server accumulates program identification information and program-related information in association with each other and, when receiving the program identification information from the television receiver, transmits the program-related information corresponding to the received program identification information to the television receiver.

According to the sixteenth aspect, since the numerical quantity of program-related information related to a television program is displayed on a television display screen, a user can recognize whether any program-related information related to the television program exists, before selecting the television program. As a result, the user can efficiently select a television program whose program-related information is to be acquired. Moreover, since access to an information server is made by utilizing program identification information instead of the address information of program-related information, the amount of data of program list information can be reduced.

In a seventeenth aspect based on the sixteenth aspect, the numerical quantity acquisition section acquires the program list information from the television signal or via the communication network.

According to the seventeenth aspect, by acquiring program list information including the numerical quantity of program-related information, the numerical quantity of the program-related information can be acquired together.

In an eighteenth aspect based on the sixteenth aspect, the numerical quantity acquisition section acquires, from the program list information, the numerical quantity with respect to a television program which is being displayed as the television picture, and the program identification information acquisition section acquires, from the program list information, the program identification information with respect to a television program which is being displayed as the television picture.

According to the eighteenth aspect, after recognizing whether any program-related information, related to a television program which is currently being viewed, exists, a user can give an instruction to acquire the program-related information.

In a nineteenth aspect based on the sixteenth aspect, an address server (i) which accumulates program identification information and address information of program-related information in association with each other and (ii), that upon receiving the program identification information from the television receiver, transmits the address information of the program-related information corresponding to the received program identification information to the television receiver. The information server accumulates address information of program-related information, instead of program identification information, so as to be associated with the program-related information. The information acquisition section acquires desired program-related information by accessing the address server by (i) utilizing the program identification information acquired by the program identification information acquisition section, and (ii) accessing the information server by utilizing the address information of the program-related information acquired from the address server.

According to the nineteenth aspect, since program identification information and the address information of program-related information are accumulated in an address server so as to be associated with each other, even in the case where an existing information server itself is employed, a television receiver can acquire program-related information from an information server by utilizing program identification information.

BRIEF DESCRIPTION OF THE DRAWINGS

FIG. 1 is a diagram illustrating the structure of a system according to first and second embodiments of the present invention.

FIG. 3 is a diagram illustrating a program list used in the television receiver according to the first and second embodiments of the present invention.

FIG. 9 is a diagram illustrating data which the television receiver, according to the first embodiment of the present invention, receives from the address server.

DETAILED DESCRIPTION OF THE INVENTION

First Embodiment

Figure 2:
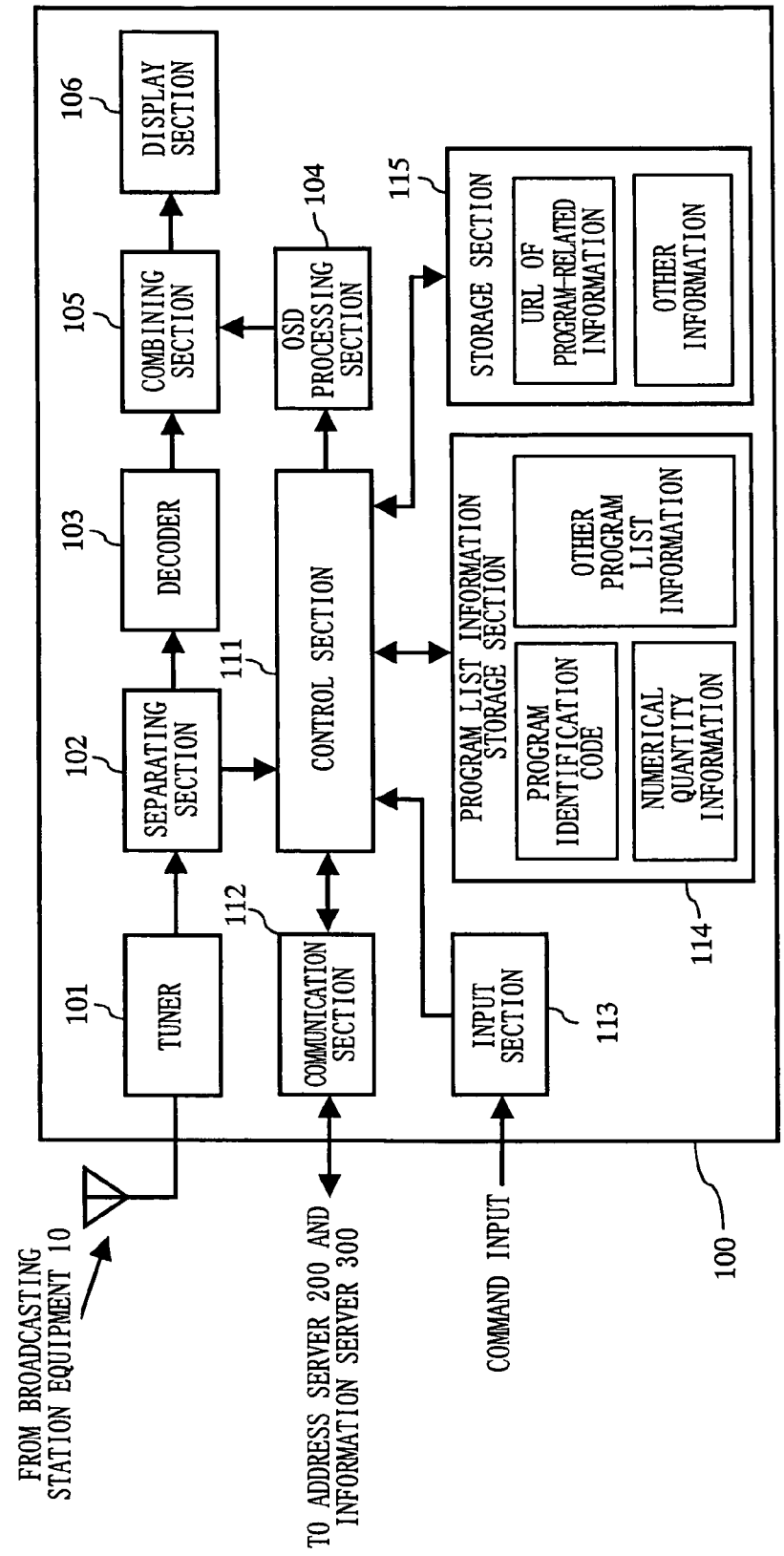
FIG. 2 is a block diagram illustrating the structure of a television receiver according to the first and second embodiments of the present invention.

FIG. 1 is a diagram illustrating the structure of a system according to a first embodiment of the present invention. The system illustrated in FIG. 1 comprises broadcasting station equipment 10, a television receiver 100, an address server 200, a plurality of information servers 300, and a communication network 20. Among these, the television receiver 100, the address server 200, and the information servers 300 are interconnected, via the communication network 20, so as to be capable of communicating with one another. Moreover, the broadcasting station equipment 10 and the address server 200 are interconnected via a dedicated line at all times. Note that while only one television receiver 100 is shown in FIG. 1, a large number of television receivers 100 are actually included in the system illustrated in FIG. 1.

The broadcasting station equipment 10 is equipment under administration of a television broadcaster. The broadcasting station equipment 10 transmits a television signal 11 to the television receiver 100. The television receiver 100 has a television broadcast receiving function. In other words, the television receiver 100 receives the television signal 11 transmitted from the broadcasting station equipment 10, obtains a television picture based on the received television signal 11, and displays the obtained television picture on a television display screen. A television broadcast conducted by the television broadcaster is typically a digital television broadcast but may be an analog television broadcast.

The information servers 300 are servers for accumulating information related to television programs (hereinafter referred to as program-related information). In the case of a television program which introduces a dish which is provided at a certain restaurant, for example, the program-related information may include information concerning a method of preparing the dish, information concerning the restaurant, information concerning tableware to be used when the dish is served, and the like. As described above, the television receiver 100 is connected with the information servers 300 so as to be capable of communicating with one another via the communication network 20. Therefore, the television receiver 100 accesses the information servers 300, via the communication network 20, and acquires the program-related information from the information servers 300. The television receiver 100 displays the program-related information acquired from the information servers 300 on the television display screen, either superimposing it on a television picture or together with the television picture.

The address server 200 is a server under administration of a business entity which makes and provides a program list of television programs (hereinafter referred to as a program list provider). The program list provider makes a program list of television programs, converts the made program list into program list information of a form usable by the television receiver 100, and inputs the acquired program list information to the address server 200. The address server 200 transmits the inputted program list information to the broadcasting station equipment 10 which is interconnected therewith via the dedicated line. The broadcasting station equipment 10 transmits the program list information 12 received from the address server 200 to the television receiver 100, with the program list information 12 being contained in the television signal 11.

In a usual operation, the television receiver 100 displays, on the television display screen, a television picture based on the television signal. Moreover, the television receiver 100 makes a program list which is recognizable by a user based on the program list information contained in the television signal 11, and, in accordance with an instruction from the user, displays the made program list on the television display screen, either superimposing it on a television picture or together with the television picture.

In addition, the program list provider obtains, with respect to each television program to be included in the program list, program identification information which is capable of uniquely identifying a television program, and makes the program list so as to include program identification information corresponding to the television programs. Here, the program identification information is, for example, information including at least a channel and a date and time (e.g., a combination of a date and time at which a program starts and a date and time at which the program ends, or a combination of a date and time at which a program starts and a length of the program), on or at which a television program is broadcast, or, more preferably, encoded information including a channel and a date and time, on or at which a television program is broadcast.

In the case where program identification information including a channel and a date and time is used, it is impossible to distinguish between different television programs which are broadcast on the same channel and at the same date and time but in different regions. Because of this, in order to uniquely identify a television program by utilizing the program identification information as described above, region information for distinguishing broadcast regions is further required. Although zip codes, area codes, and/or the like are generally used as region information, regions defined by such region information do not necessarily correspond to broadcast regions. Because of this, even if program identification information including a channel and a date and time is used and region information is further used, it may so happen that programs cannot be identified uniquely. In this case, encoded information including at least a broadcasting station which broadcasts a television program and a date and time at which the television program is broadcast may be used as program identification information. When program identification information including a broadcasting station and a date and time is used, a television program can be identified with greater accuracy than when program identification information including a channel and a date and time is used. As program identification information, G-code® provided by US Gemstar, Co. may be used. Hereinafter, it is assumed in the present embodiment that encoded information including a broadcasting station and a date and time is used as program identification information, and this information will be referred to as a program identification code.

Moreover, with respect to each television program to be included in the program list, the program list provider obtains the number of program-related information related to each television program (hereinafter referred to as numerical quantity information), and makes the program list so as to include the obtained numerical quantity information. Note, however, that the above-described numerical quantity information is a number obtained by counting, among the program-related information accumulated in the information servers 300, only the program-related information whose address information is accumulated in the address server 200 so as to be associated with a program identification code. As a result, the program list information 12, including the program identification code and the numerical quantity information, is transmitted from the address server 200 to the broadcasting station equipment 10, via the dedicated line. The television signal 11 containing the program list information, which includes the program identification code and the numerical quantity information, is transmitted from the broadcasting station equipment 10 to the television receiver 100 via a broadcasting network.

In the following description, it is assumed that the television receiver 100 acquires program list information from the received television signal 11, but it may acquire the program list information via the communication network 20 instead. For example, the television receiver 100 may communicate with the address server 200 as necessary and acquire the program list information from the address server 200.

FIG. 2 is a block diagram illustrating a structure of the television receiver 100. The television receiver 100 comprises a tuner 101, a separating section 102, a decoder 103, an OSD (On Screen Display) processing section 104, a combining section 105, a display section 106, a control section 111, a communication section 112, an input section 113, a program list information storage section 114, and a storage section 115.

The tuner 101 extracts, from within the television signal 11 transmitted from the broadcasting station equipment 10, a signal of a frequency band which is selected by the user and outputs it as a transport stream. The separating section 102 separates the transport stream outputted from the tuner 101 into a digital video signal, a digital audio signal, and a control signal. The decoder 103 derives an analog video signal and an analog audio signal, based on the encoded digital video signal and digital audio signal outputted from the separating section 102. The OSD processing section 104 outputs an OSD display signal, based on an OSD control signal outputted from the control section 111. The combining section 105 combines the OSD display signal outputted from the OSD processing section 104 with the analog video signal outputted from the decoder 103. The display section 106 displays the analog video signal outputted from the combining section 105 on the display screen. Note that the analog audio signal outputted from the decoder 103 is outputted from an audio output section (not shown).

The control section 111 exercises various controls in relation to the television receiver 100. The communication section 112, in accordance with the control from the control section 111, transmits and/or receives data to or from the address server 200 and the information servers 300 which are connected to the communication network 20. The input section 113 is an input device for inputting a command from the user. The input section 113 outputs a command input signal to the control section 111, in accordance with the command inputted from the user.

The program list information storage section 114 and the storage section 115 store work data for the control section 111. The program list information transmitted from the broadcasting station equipment 10 is contained in the control signal obtained by the separation at the separating section 102. Among the work data for the control section 111, the program list information is stored in the program list information storage section 114. Since the program identification code and numerical quantity information of each television program, which is included in the program list, are contained in the program list information which has been broadcast from the broadcasting station equipment 10, the program identification code and numerical quantity information are also stored in the program list information storage section 114, as shown in FIG. 2. Among the work data for the control section 111, any data other than the program list information is stored in the storage section 115. The storage section 115 stores, for example, a URL (Uniform Resource Locator) for the program-related information as the address information of the program-related information. In the above description, it is assumed that the television receiver 100 is provided with the program list information storage section 114 and the storage section 115 separately. However, it is needless to say that both may be constructed as one storage section.

When a screen other than television pictures is to be displayed on the television display screen of the television receiver 100, the control section 111 generates an OSD control signal for generating a screen other than television pictures and outputs the generated OSD control signal to the OSD processing section 104. As a result, a program list, a banner, a command input screen, and/or the like are displayed on the television display screen, either being superimposed on a television picture or together with the television picture.

FIG. 3 is a diagram illustrating a program list used in the television receiver 100. The program list shows from which broadcasting station (or on which channel) and when each television program is broadcast. In the program list illustrated in FIG. 3, broadcasting stations (or channels) are arranged in a horizontal direction while television programs to be broadcast from each broadcasting station (or on each channel) are arranged chronologically in a vertical direction. A title, a program identification code, and a piece of numerical quantity information are associated with each television program included in the program list. In FIG. 3, the data represented as items TITLE, PCODE, and INFNO are, respectively, the title, program identification code, and numerical quantity information of each television program.

In the program list illustrated in FIG. 3, for example, the title of the television program to be broadcast between 19 o'clock and 20 o'clock by B Broadcaster is "Dishes of the Season," the program identification code thereof is "35678349," and the numerical quantity information thereof is "3."

Figure 4:
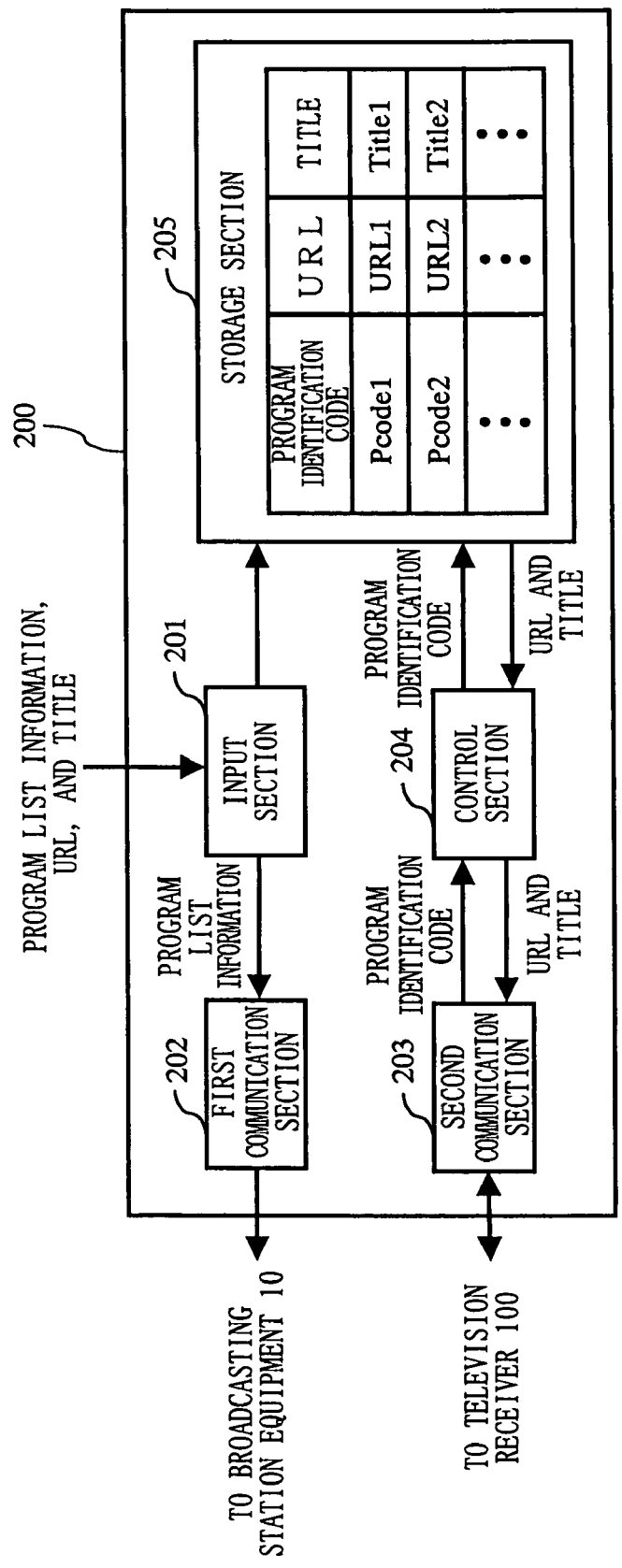
FIG. 4 is a diagram illustrating the structure of an address server according to the first and second embodiments of the present invention.

FIG. 4 is a block diagram illustrating a structure of the address server 200. The address server 200 comprises an input section 201, a first communication section 202, a second communication section 203, a control section 204, and a storage section 205. The input section 201 is an input device for inputting data into the address server 200. The program list provider (the administrator of the address server 200) converts the program list including program identification codes and numerical quantity information into program list information of a form usable by the television receiver 100, and inputs the obtained program list information by employing the input section 201. The first communication section 202 transmits the inputted program list information to the broadcasting station equipment 10 which is connected therewith via the dedicated line.

Utilizing the input section 201, the program list provider inputs, with respect to each television program included in the program list, a URL and a title of program-related information related to each television program, along with the program list information. At this time, if there is a plurality of pieces of program-related information related to one television program, the program list provider inputs a plurality of URLs and a plurality of titles for the one television program. The URLs and titles inputted from the input section 201 are stored in the storage section 205, while maintaining their association with the program identification codes of the television programs corresponding to the URLs.

Figures 5, 6:
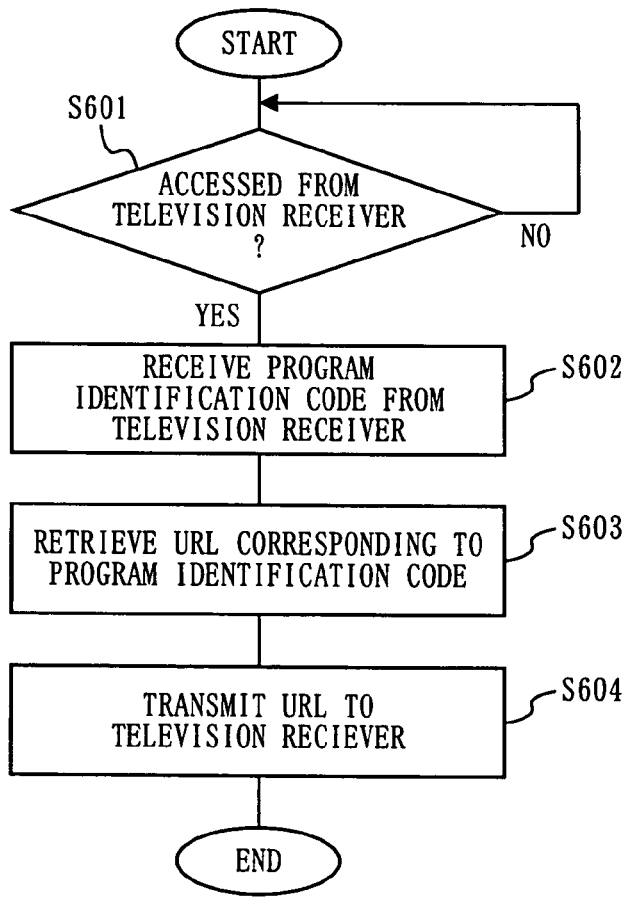
FIG. 5 is a diagram illustrating a table to be stored in the address server according to the first and second embodiments of the present invention.
FIG. 6 is a flowchart illustrating a URL providing process by the address server according to the first and second embodiments of the present invention.

FIG. 5 is a diagram illustrating data to be stored in the storage section 205 of the address server 200. In the storage section 205, as shown in FIG. 5, URLs and titles of program-related information are stored so as to be associated with program identification codes. The data illustrated in FIG. 5 corresponds to the program list illustrated in FIG. 3. In the program list illustrated in FIG. 3, the program identification code of the television program which is broadcast between 20 o'clock and 21 o'clock by A Broadcaster is "98765," and the numerical quantity information thereof is "1." Corresponding thereto, in the storage section 205, as shown in FIG. 5, one URL and one title of program-related information related to the television program whose program identification code is "98765" are stored. The program identification code of the television program which is broadcast between 19 o'clock and 20 o'clock by B Broadcaster is "34678349," and the numerical quantity information thereof is "3." Corresponding thereto, in the storage section 205, three URLs and three titles of the program-related information related to the television program whose program identification code is "34678349" are stored.

Referring back to FIG. 4, the second communication section 203 transmits and/or receives data to or from the television receiver 100 which is connected therewith via the communication network 20. The second communication section 203 receives a program identification code from the television receiver 100. The control section 204 performs a search in the storage section 205 utilizing the program identification code received at the second communication section 203. The second communication section 203 transmits a URL and a title retrieved by the control section 204 to the television receiver 100.

FIG. 6 is a flowchart showing a URL providing process by the address server 200. The control section 204 of the address server 200 performs the following process when the second communication section 203 commences communication with the television receiver 100.

The control section 204 waits until the address server 200 is accessed from the television receiver 100 (that is, until the second communication section 203 commences communication with the television receiver 100) (step S601). When the address server 200 is accessed from the television receiver 100 (YES at step S601), the control section 204 receives the program identification code from the television receiver 100, utilizing the second communication section 203.

Next, the control section 204 retrieves the URL and title corresponding to the received program identification code (step S603). More specifically, the control section 204 performs a search in the storage section 205 utilizing the program identification code received at step S602 and reads the URL and title corresponding to the program identification code out of the storage section 205.

Next, the control section 204 transmits the URL and title read out at step S603 to the television receiver 100 which has accessed the address server 200, by utilizing the second communication section 203 (step S604). In this manner, the address server 200 transmits the URL and title corresponding to the received program identification code to the television receiver 100.

Figure 7:
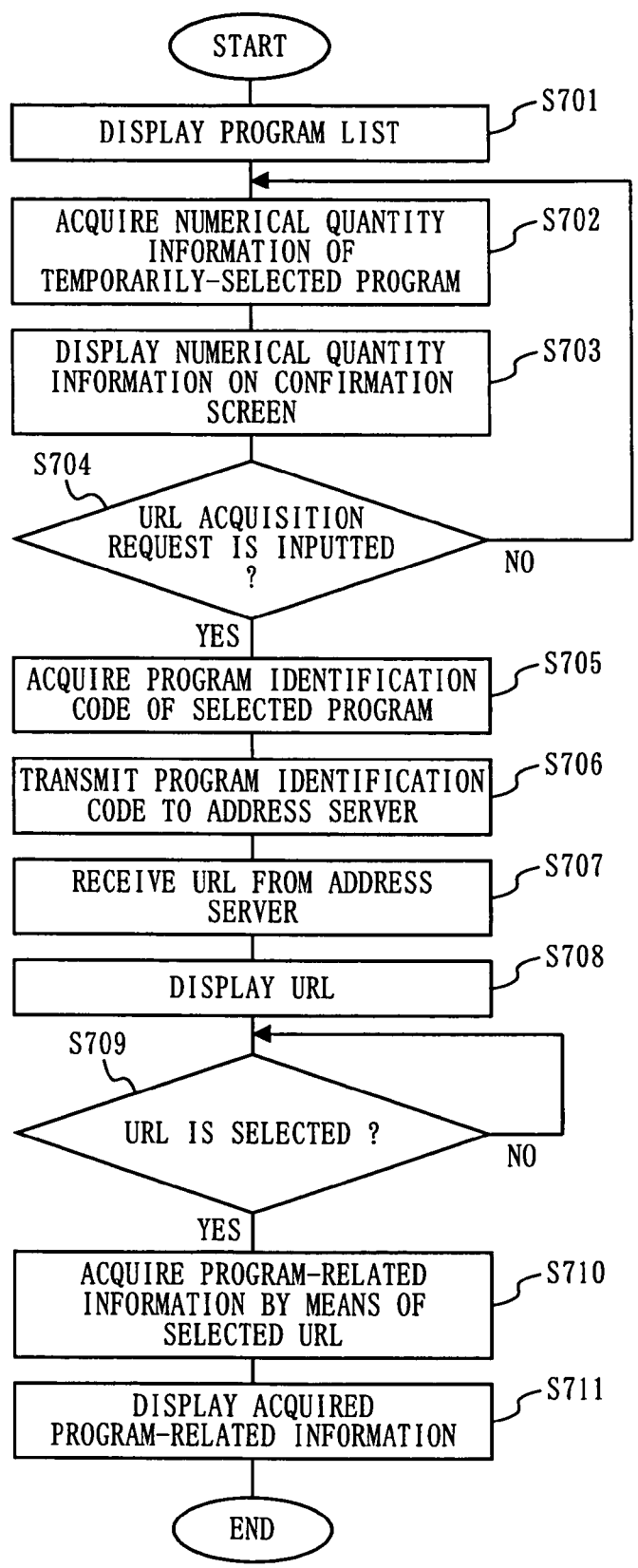
FIG. 7 is a flowchart illustrating an information acquisition process by the television receiver according to the first embodiment of the present invention.

FIG. 7 is a flowchart showing the information acquisition process by the television receiver 100. The process shown in FIG. 7 is performed in the case where the user acquires program-related information by referring to the program list displayed on the television display screen. Note that it is assumed that, before the process shown in FIG. 7 is performed, program list information containing a program identification code and numerical quantity information has been stored in the program list information storage section 114 of the television receiver 100, whereas the program identification code and the URL and title of the program-related information have been stored in the storage section 205 of the address server 200.

The control section 111 first exercises control to display the program list on the television display screen, based on the program list information stored in the program list information storage section 114 (step S701). At this time, the control section 111 exercises control to display each television program included in the program list in a manner corresponding to the numerical quantity information of each television program. For example, the control section 111 may exercise control to display a television program included in the program list so as to be (i) darker in color as the numerical quantity information thereof becomes greater, and (ii) lighter in color as the numerical quantity information thereof becomes less. Alternatively, the control section 111 may exercise control to display a television program for which program-related information exists (i.e., a television program whose numerical quantity information is equal to or greater than one) in a different background color from that used for a television program for which no program-related information exists. Alternatively, the control section 111 may exercise control to (i) add a predetermined character string and/or symbol in accordance with the numerical quantity information of each television program, or (ii) display each television program after adding thereto the numerical quantity information of each television program as it is.

Next, the control section 111 reads the numerical quantity information of a television program which the user is temporarily selecting, out of the program list information storage section 114 (step S702). Next, the control section 111 exercises control to display a confirmation screen which contains the numerical quantity information which has been read out at step S702 (step S703).

Figure 8:
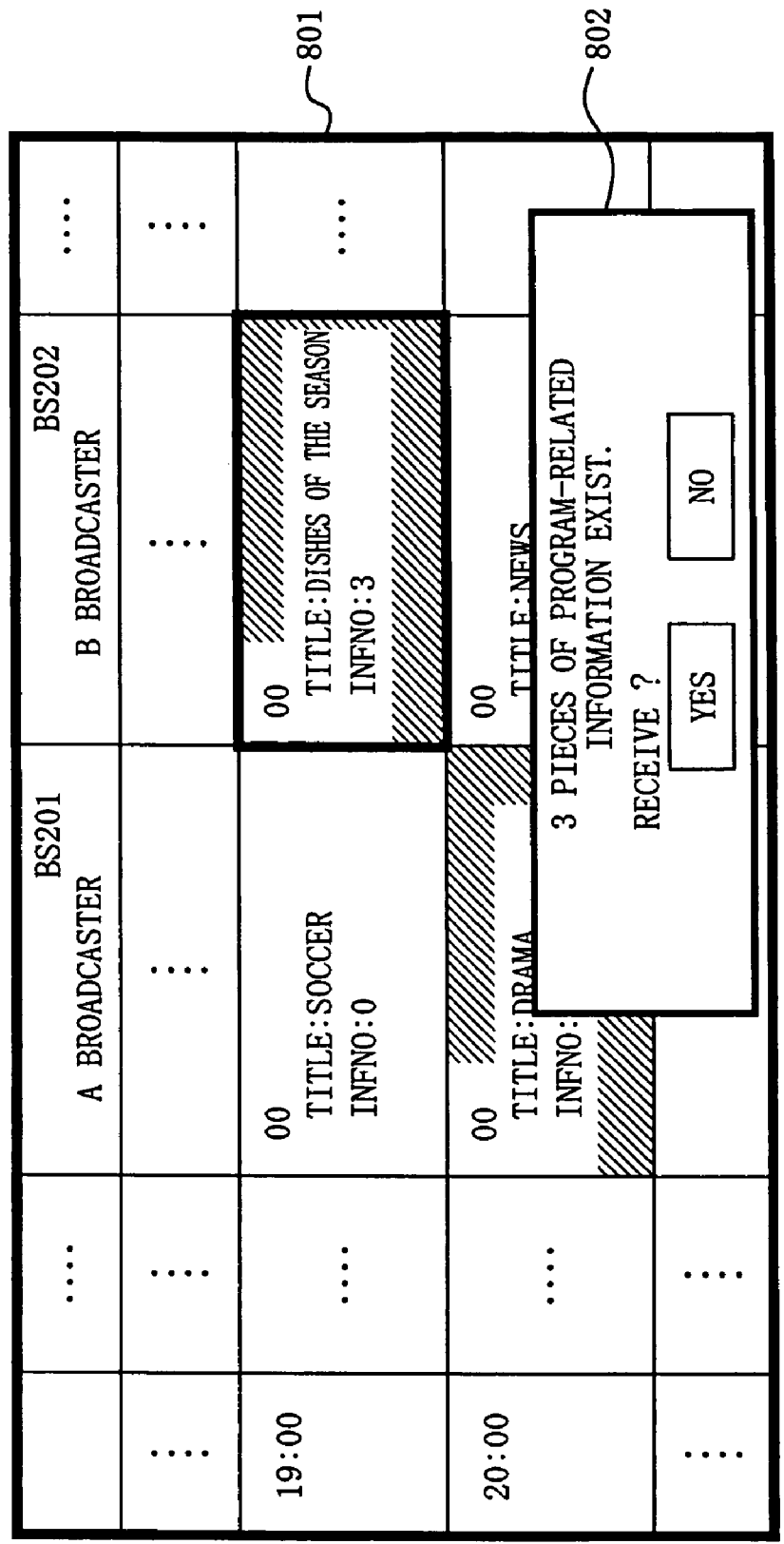
FIG. 8 is a diagram illustrating a manner in which a confirmation screen is displayed on the television receiver according to the first embodiment of the present invention.

FIG. 8 is a diagram illustrating a manner in which a confirmation screen is displayed on the television display screen. In a television display screen 801 illustrated in FIG. 8, the program list which is illustrated in FIG. 3 is being displayed. In the television display screen 801, the title and numerical quantity information of each television program are being displayed, while no program identification code is being displayed so that the program list is easy to see. Moreover, in order for the user to easily see whether any program-related information exists, a television program for which program-related information exists is emphatically displayed by using a different background color from that used for a television program for which no program-related information exists.

For example, on the television display screen 801, a television program whose title is "Dishes of the Season" and a television program whose title is "Drama" are being emphatically displayed. In the case where each television program included in the program list is displayed in a different manner depending on whether or not any program-related information therefor exists, it is not necessarily required that the numerical quantity information of each television program be displayed on the television display screen.

Assuming that the user is temporarily selecting the television program whose title is "Dishes of the Season" for the time being, a confirmation screen 802 illustrated in FIG. 8 is displayed on the television display screen 801. According to the program list illustrated in FIG. 3, the numerical quantity information of the television program whose title is "Dishes of the Season" is "3." In other words, in the address server 200, three URLs for the program-related information related to this television program are accumulated so as to be associated with the program identification code of this television program. In order to allow the user to recognize this fact, the control section 111 exercises control to display, on the television display screen, the confirmation screen 802 which contains the numerical quantity information of this television program (three pieces, in this example) and a confirmation button for inquiring, from the user, as to whether the user accepts the current selection (which in this example consists of two buttons "Yes" and "No").

Referring back to FIG. 7, the control section 111 next determines whether a URL acquisition request has been inputted from the user (step S704). Until a URL acquisition request is inputted from the user (i.e., while step S704 indicates NO), the control section 111 performs the processes S702 to S704 repeatedly. If a URL acquisition request is inputted from the user (YES at step S704), the control section 111 acquires the program identification code, of the television program selected by the user, and from the program list information storage section 114 (step S705).

Next, the control section 111 transmits the program identification code acquired at step S705 to the address server 200 by utilizing the communication section 112 (step S706). When receiving the program identification code from the television receiver 100, the address server 200 performs the process illustrated in FIG. 6. As a result, a URL and a title of the program-related information corresponding to the program identification code which the television receiver 100 has transmitted are transmitted from the address server 200 to the television receiver 100.

Next, the control section 111 receives the URL and title transmitted from the address server 200 by utilizing the communication section 112 (step S707). FIG. 9 is a diagram illustrating data which the television receiver 100 receives from the address server 200. In FIG. 9, the URLs and titles are shown which are transmitted from the address server 200 to the television receiver 100 when the television receiver 100 transmits the program identification code "34678349" to the address server 200 in a situation where the data shown in FIG. 5 is stored in the storage section 205 of the address server 200. In this example, three pieces of program-related information corresponding to the program identification code "34678349" exist, and also three URLs and titles of the program-related information exist. Therefore, in the data the television receiver 100 receives from the address server 200, three URLs and titles are contained.

Figure 10:
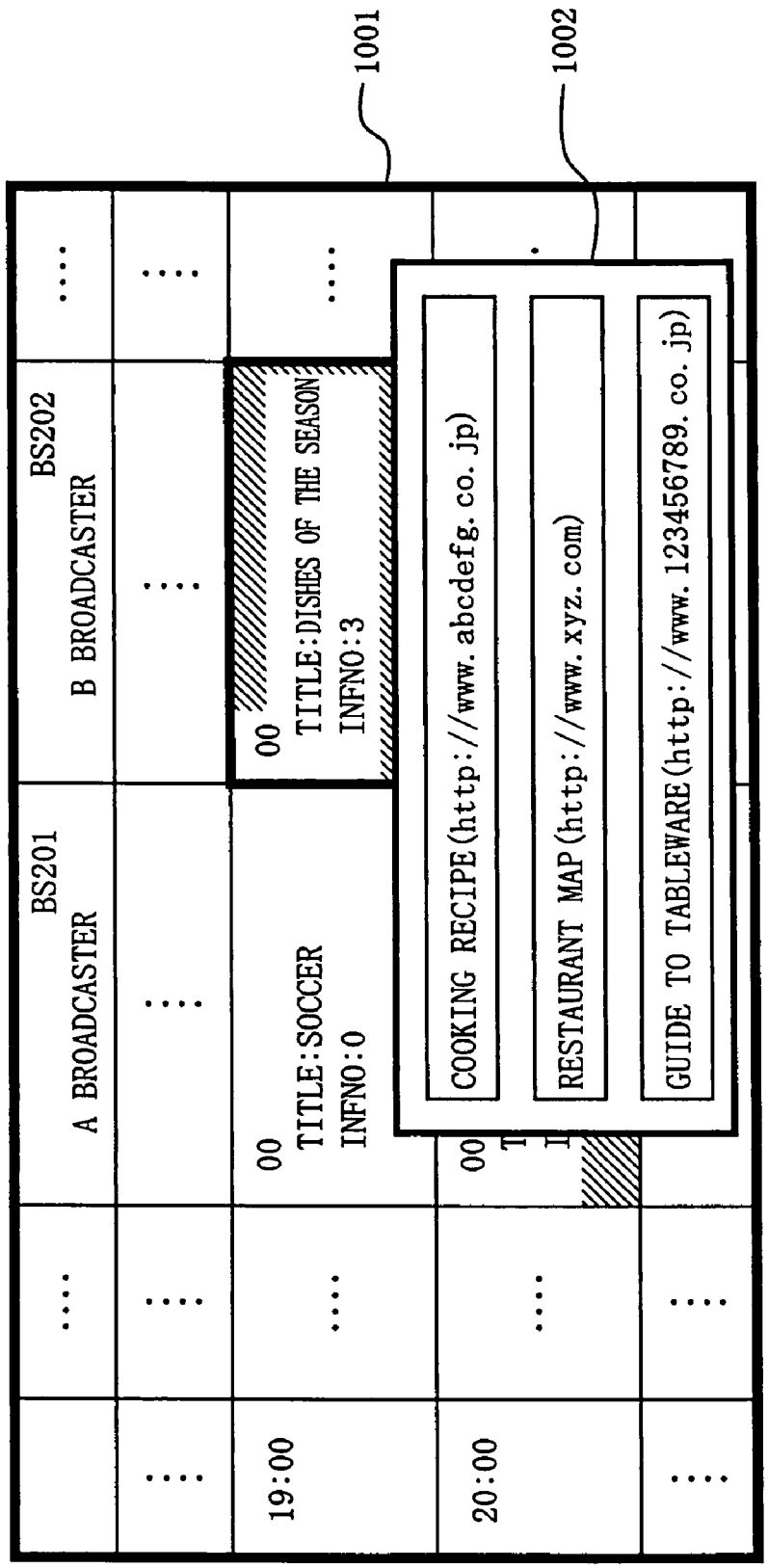
FIG. 10 is a diagram illustrating a manner in which a received URL is displayed on the television receiver according to the first embodiment of the present invention.

Next, the control section 111 exercises control to display the URLs and titles received from the address server 200 on the television display screen (step S708). FIG. 10 is a diagram illustrating a manner in which the received URLs and titles are displayed on the television display screen. On a television display screen 1001 illustrated in FIG. 10, the program list illustrated in FIG. 3 is being displayed. In addition, on the television display screen 1001, a URL display screen 1002 for displaying the three URLs and three titles received at step S707 in such a manner that both are associated with each other is displayed so as to be superimposed upon the program list.

Next, the control section 111 waits until any URL is selected by the user (step S709). When a certain URL is selected by the user (YES at step S709), the control section 111 acquires program-related information by means of the selected URL by utilizing the communication section 112 (step S710). More specifically, the control section 111 accesses an information server 300 corresponding to the selected URL by utilizing the communication section 112. When receiving the URL from the television receiver 100, the information server 300 transmits the program-related information corresponding to the received URL to the television receiver 100.

Figure 11:
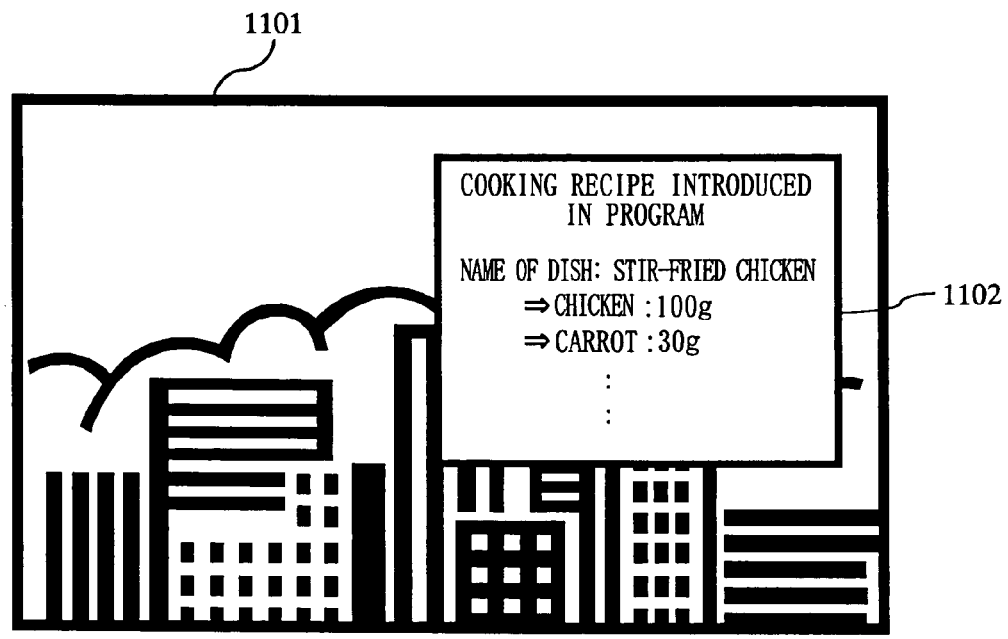
FIG. 11 is a diagram illustrating a manner in which program-related information is displayed on the television receiver according to the first embodiment of the present invention.

Next, the control section 111 exercises control to display the program-related information acquired from the URL which has been selected by the user on the television display screen by utilizing the communication section 112 (step S711). FIG. 11 is a diagram illustrating a manner in which program-related information is displayed on the television display screen of the television receiver 100. On a television display screen 1101 illustrated in FIG. 11, a television picture obtained by filming some buildings is being displayed. In addition thereto, on the television display screen 1101, a program-related information screen 1102 for showing program-related information is displayed so as to be superimposed on the television picture. The program-related information screen 1102 is displayed when the program-related information whose title is "Cooking Recipe" is selected by the user in a situation where the URL display screen 1002 illustrated in FIG. 10 is displayed on the television display screen. As described above, by the control section 111 performing the process illustrated in FIG. 7, the program-related information selected by the user is displayed on the television display screen, either being superimposed on the television picture, or in place of the television picture, or together with the television picture.

As shown above, a system according to the present embodiment comprises a television receiver, an address server, and an information server which are interconnected so as to be capable of communicating with one another. In addition to having a television broadcast receiving function, the television receiver acquires, from program list information, numerical quantity information which indicates the numerical quantity of program-related information and displays the acquired numerical quantity information on a television display screen. Thus, a user can see whether any program-related information related to a television program exists or not before selecting the television program. Accordingly, the user can efficiently select a television program whose program-related information is to be acquired.

Moreover, by selecting a television program whose program-related information is to be acquired by using the program list displayed on the television display screen, the user can acquire program-related information related to a television program which is not being viewed. Furthermore, by displaying, on the television display screen, the numerical quantity of program-related information so as to be associated with the program list, or by showing, on the program list, each television program in a manner corresponding to its numerical quantity of program-related information, the user can easily see whether or not any program-related information related to a television program exists.

Moreover, by accessing an information server not by using the address information of program-related information, but rather by using program identification information, the quantity of data of the program list information can be reduced. Furthermore, even in the case where an existing information server is used as it is, by accumulating program identification information and the address information of program-related information in the address server with both being associated with each other, the television receiver can acquire program-related information from the information server by using the program identification information.

Second Embodiment

In a second embodiment of the present invention, a television receiver which acquires program-related information related to a television program which is being viewed, and a system including the same will be described. The television receiver 100 according to the present embodiment performs two processes, i.e., a banner display process and an information acquisition process.

Since the structure of the system according to the present embodiment is the same as that of the first embodiment, the descriptions thereof are omitted here (see FIG. 1 and the description thereof). Moreover, since the structure of the television receiver, the structure of a program list, the structure of an address server, data to be stored in the storage section of the address server, and a process performed at the address server according to the present embodiment are also identical to those of the first embodiment, the descriptions thereof are omitted here (see FIG. 2 to FIG. 6 and the descriptions thereof).

Figure 12:
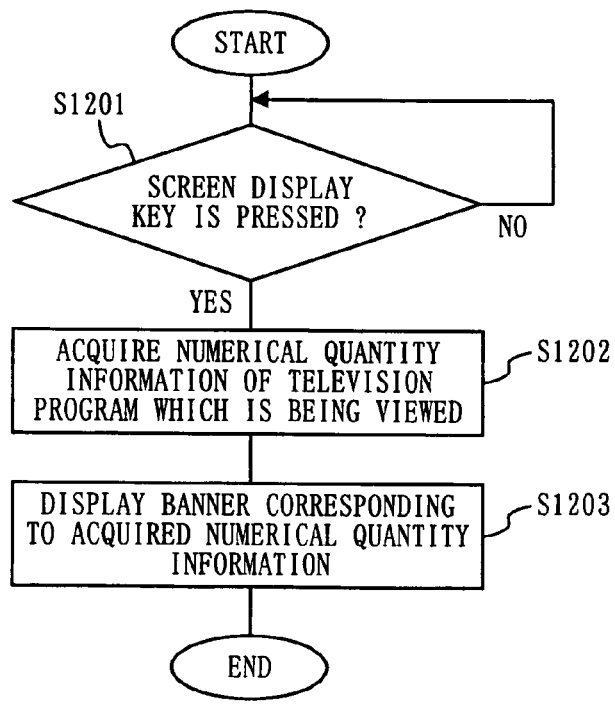
FIG. 12 is a flowchart illustrating a banner display process by the television receiver according to the second embodiment of the present invention.

FIG. 12 is a flowchart illustrating the banner display process by the television receiver 100. The process illustrated in FIG. 12 is performed to allow a user to recognize that program-related information related to a television program which is being viewed exists.

The banner display process is performed when a screen display key is pressed. Therefore, the control section 111 waits until the user presses the screen display key (step S1201). When the user presses a screen display key (YES at step S1201), the control section 111 reads the numerical quantity information of a television program displayed on the television display screen, out of the program list information storage section 114 (step S1202). Next, the control section 111 exercises control to display a banner corresponding to the numerical quantity information which has been readout at step S1202 on the television display screen (step S1203). For example, the control section 111 may exercise control to display a banner which shows the numerical quantity information which has been read out on the television display screen. Alternatively, the control section 111 may exercise control to display, on the television display screen, a banner which indicates the presence of program-related information if the numerical quantity information which has been read out is equal to or greater than one, and display, on the television display screen, no banner if the numerical quantity information which has been read out is zero.

Figure 13:
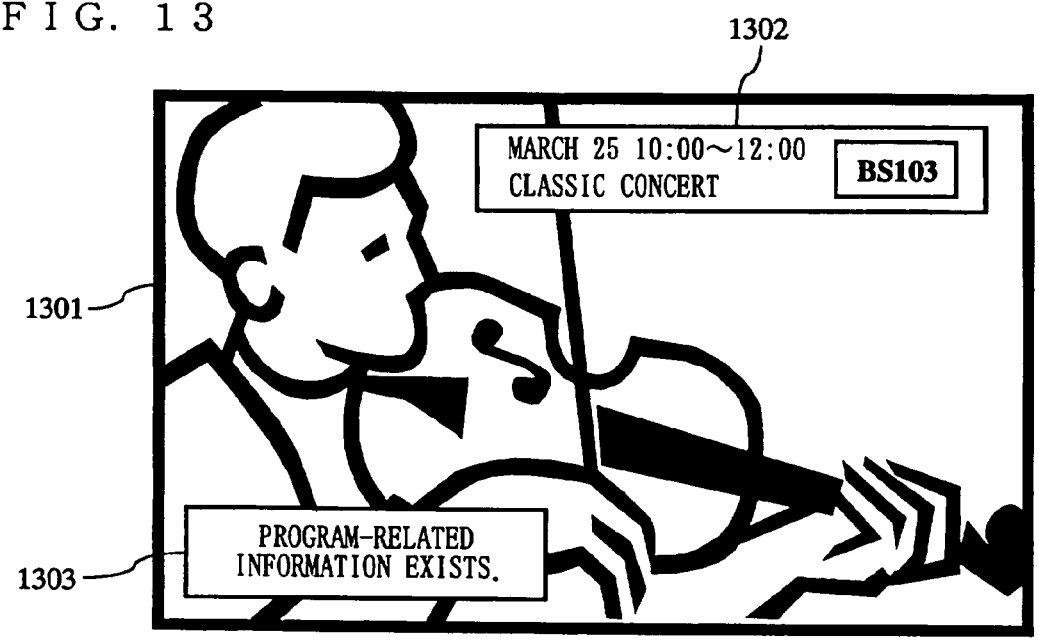
FIG. 13 is a diagram illustrating a manner in which a banner concerning program-related information is displayed on the television receiver according to the second embodiment of the present invention.

FIG. 13 is a diagram illustrating a manner in which a banner concerning program-related information is displayed on the television display screen. On a television display screen 1301 illustrated in FIG. 13, a television picture obtained by filming a classic concert is being displayed. If the user presses the screen display key by utilizing the input section 113, a banner 1302 showing basic information (a date and time and a title) concerning a television program is displayed on the television display screen 1301 so as to be superimposed upon the television picture. At this time, if any program-related information related to a television program displayed on the television display screen (i.e., a television program which is being viewed) exists, a banner 1303 indicating the presence of the program-related information is displayed so as to be superimposed on the television picture. Note that it is assumed in the example illustrated in FIG. 13 that the banner 1303 is displayed when any program-related information exists but not displayed when no program-related information exists.

By looking at the banner 1303, the user of the television receiver 100 recognizes the presence of any program-related information related to the television program that is being displayed on the television display screen.

Figure 14:
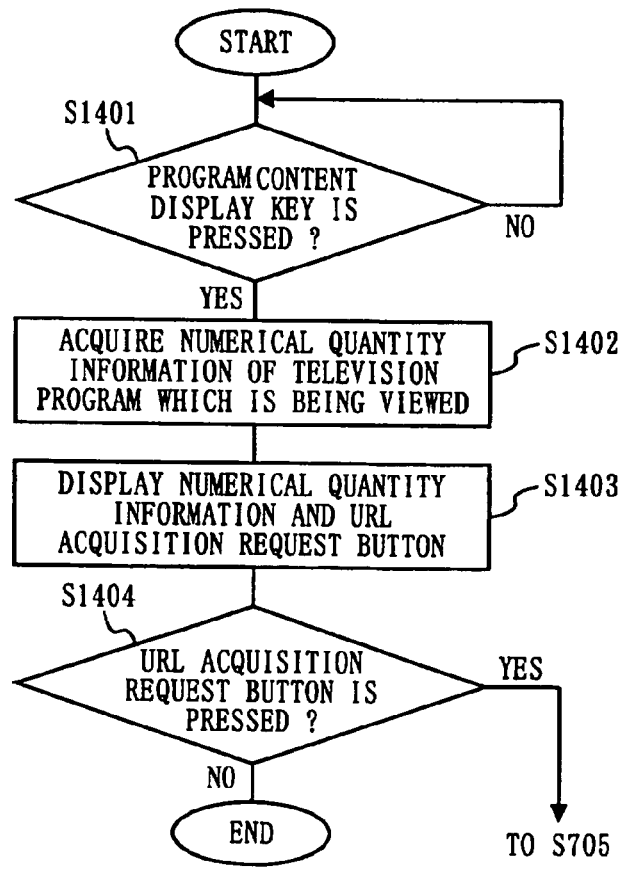
FIG. 14 is a flowchart illustrating a information acquisition process by the television receiver according to the second embodiment of the present invention.

FIG. 14 is a flowchart illustrating the information acquisition process by the television receiver 100. Note, however, that, in the information acquisition process by the television receiver 100 according to the present embodiment, illustration is omitted for the part which coincides with the information acquisition process by the television receiver according to the first embodiment.

The user presses a program content display key if he or she becomes interested in the program-related information. An information acquisition process is carried out when a program content display key is pressed. Therefore, the control section 111 waits until the user presses a program content display key (step S1401). If the user presses a program content display key (YES at step S1401), the control section 111 reads the numerical quantity information of a television program which is being displayed on the television display screen, out of the program list information storage section 114 (step S1402). Next, the control section 111 exercises control to display, on the television display screen, the numerical quantity information which has been read out at step S1402 and a URL acquisition request button (step S1403).

Figure 15:
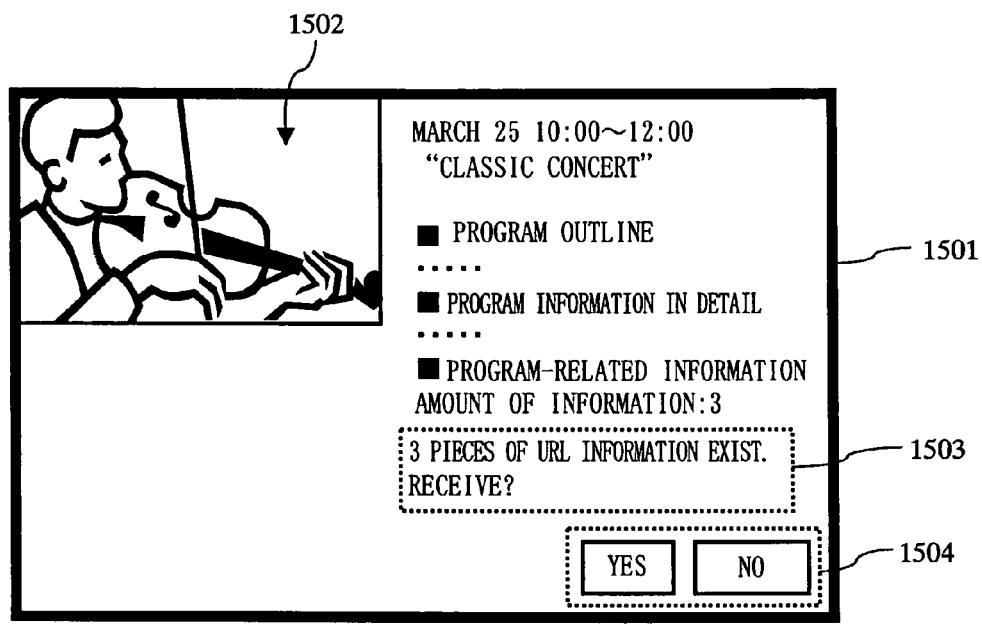
FIG. 15 is a diagram illustrating a manner in which a program content concerning a television program which is being viewed is displayed on the television receiver according to the second embodiment of the present invention.

FIG. 15 is a diagram illustrating a manner in which a program content as to the television program which is being viewed is displayed on the television display screen. On a television display screen 1501 illustrated in FIG. 15, a television picture 1502 obtained by filming the classic concert is being displayed in reduced size. Moreover, on portions other than the reduced television picture 1502, basic information (a date and time and a title), a program outline, program information in detail, and program-related information of the displayed television program are being displayed in OSD fashion. On the portion for the program-related information, the numerical quantity information 1503 of the displayed television program (three pieces, in FIG. 15) and confirmation buttons 1504 for inquiring of the user as to whether he or she will acquire program-related information are displayed.

Referring back to FIG. 14, the control section 111 next determines whether the user has pressed the URL acquisition request button (step S1404). In the example illustrated in FIG. 15, the control section 111 determines that the URL acquisition request button is pressed if a "YES" button is pressed among the confirmation buttons 1504, and determines that the URL acquisition request button has not been pressed if a "NO" button is pressed.

If the URL acquisition request button is pressed (YES at step S1404), the control section 111 proceeds to step S705 shown in FIG. 7. In this case, by accessing the address server 200 and the information servers 300 as in the first embodiment, the television receiver 100 acquires the program-related information selected by the user and displays the acquired program-related information on the television display screen. On the other hand, if the URL acquisition request button has not been pressed (NO at step S1404), the television receiver 100 finishes the information acquisition process without acquiring any program-related information.

As described above, the television receiver according to the present embodiment displays, on the television display screen, the numerical quantity information of a television program which is being viewed. Accordingly, a user can give an instruction to acquire program-related information after recognizing whether or not any program-related information related to the television program which is being viewed exists. Moreover, by displaying, on the television display screen, a banner corresponding to the numerical quantity of program-related information, the user can easily recognize whether or not any program-related information related to the television program which is being viewed exists. Furthermore, by displaying the numerical quantity of program-related information together with a television picture in reduced size, the user can recognize whether or not any program-related information related to the television program which is being viewed exists while watching the television program.

Figure 16:
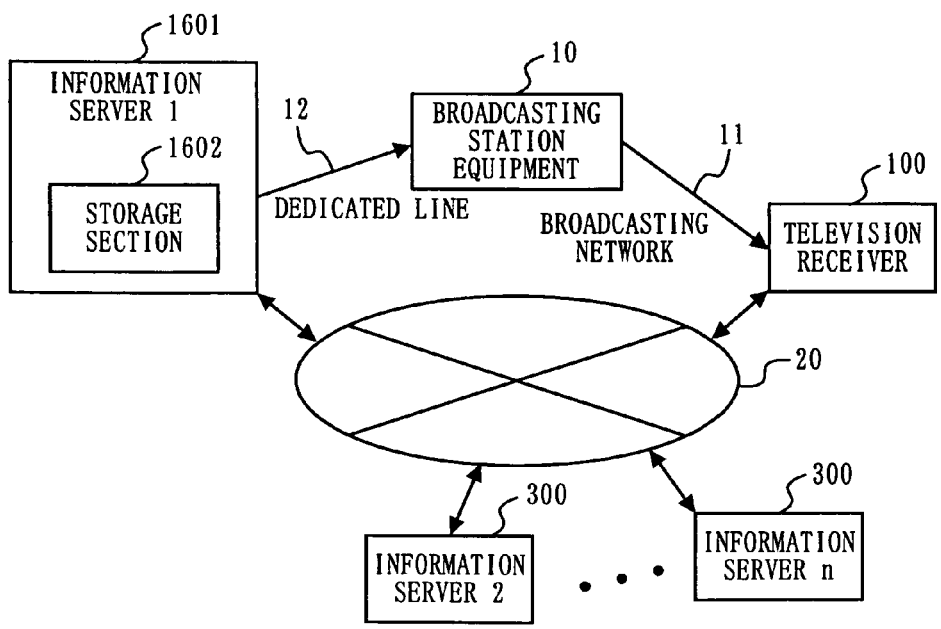
FIG. 16 is a block diagram illustrating another structure of the system according to the first and second embodiments of the present invention.
Figure 17:
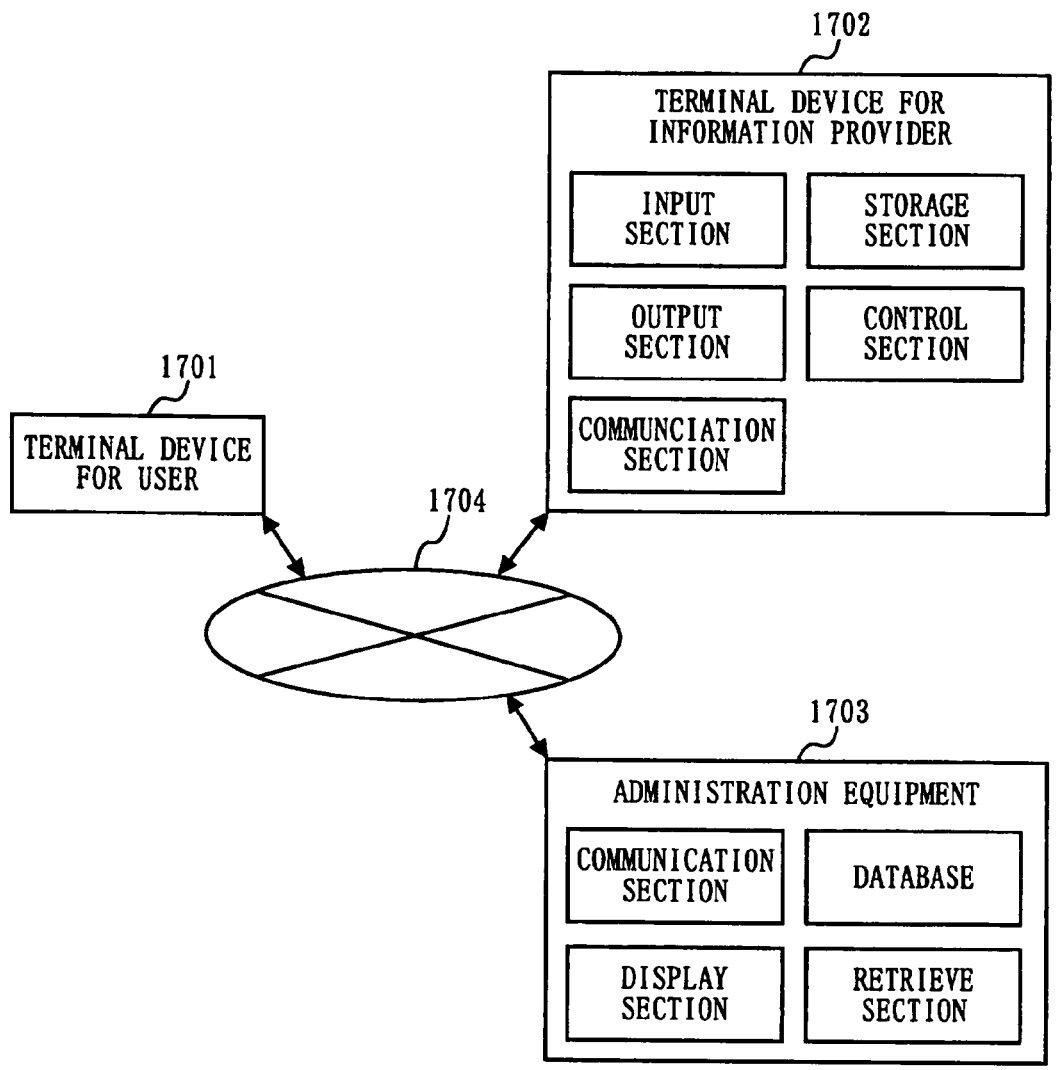
FIG. 17 is a diagram illustrating the structure of a conventional information providing system.

Note that, in the systems according to the first and second embodiments above, the television receiver, instead of accessing an address server and an information server by taking two steps, may acquire program-related information by accessing an information server 1601 one time in which a program identification code and program-related information are stored in a storage section 1602 so as to be associated with each other, as illustrated in FIG. 16. Note also that an address server may be constructed within broadcasting station equipment as one unit, and be kept under management by a television broadcaster.

Moreover, although the television receiver according to the second embodiment is illustrated as displaying, on the television display screen, a program content screen containing the numerical quantity information of a television program which is being viewed together with a television picture in reduced size, the television receiver may display, on the television display screen, a program content screen containing the numerical quantity information of a television program which is not being viewed, together with a television picture in reduced size. For example, if a program content display key which specifies a television program B which is not being received is pressed while a television program A is being received, the television receiver may display, on the television display screen, a program content screen containing the numerical quantity information of the television program B together with a television picture of the television program A in reduced size (or with a still picture of the television program B in reduced size).

As described above, the television receiver and the system including the same according to the present invention makes it possible to easily select a television program whose program-related information is to be acquired, and allow a user to recognize whether any program-related information related to a television program exists or not before selecting the television program.

The invention claimed is:

1. A television receiver for receiving a television signal and acquiring information via a communication network, the television receiver comprising:
television broadcast receiving means for obtaining a television program based on the television signal and for displaying the obtained television program on a television display screen;
numerical quantity acquisition means for acquiring, from one of the television signal and program list information that is acquired via the communication network, a numerical quantity of available program-related information related to a television program and acquirable via the communication network, such that the numerical quantity represents a specific number identifying a number of pieces of program-related information available and related to the television program;
numerical quantity display means for simultaneously displaying, for each television program of a plurality of television programs, a respective numerical quantity acquired by the numerical quantity acquisition means, as a numeric character, together with a title of each respective television program, each respective numerical quantity and the title of each respective television program being simultaneously displayed in a program list displayed on the television display screen, such that the displayed numeric character represents the specific number identifying the number of pieces of the program-related information available and related to each television program of the plurality of television programs;
input means for accepting, from a user, a selection of a television program, of which program-related information is to be acquired;
information acquisition means for acquiring, from an address server that (i) is connected to the information acquisition means via the communication network and (ii) accumulates address information of program-related information, address information only of the program-related information related to the television program selected by the user via the input means, and for acquiring the program-related information related to the television program selected by the user via the input means, the program-related information being acquired by utilizing the acquired address information; and
information display means for displaying, on the television display screen, the program-related information acquired by the information acquisition means.

2. The television receiver according to claim 1, wherein the numerical quantity display means (i) generates a program list in which each television program identified in the program list information is shown to correspond, respectively, to a numerical quantity acquired by the numerical quantity acquisition means and (ii) displays the generated program list on the television display screen.

3. The television receiver according to claim 1, wherein the numerical quantity display means generates, based on the program list information, a program list including the numerical quantity acquired by the numerical quantity acquisition means and displays the generated program list on the television display screen.

4. The television receiver according to claim 3, wherein the numerical quantity display means displays, on the television display screen, (i) a program content screen including the numerical quantity acquired by the numerical quantity acquisition means, and (ii) the obtained television program having a reduced size.

5. The television receiver according to claim 1, wherein the numerical quantity acquisition means acquires the numerical quantity with respect to a television program which is being displayed by the television broadcast receiving means.

6. The television receiver according to claim 1 wherein the numerical quantity display means displays a banner which (i) corresponds to the numerical quantity acquired by the numerical quantity acquisition means, and (ii) is superimposed on the television program being displayed by the television broadcast receiving means.

7. The television receiver according to claim 1, wherein the numerical quantity display means displays, on the television display screen, (i) a program content screen including the numerical quantity acquired by the numerical quantity acquisition means and (ii) the obtained television program having a reduced size.

8. The television receiver according to claim 1, further comprising program identification information acquisition means for acquiring, from the program list information, program identification information for uniquely identifying a television program,
   wherein the information acquisition means acquires desired program-related information via the communication network by utilizing the program identification information acquired by the program identification information acquisition means.

9. The television receiver according to claim 8, wherein the information acquisition means acquires the desired program-related information by accessing an information server connected thereto in which program identification information and program-related information are accumulated in association with each other, the information server being accessed by utilizing the program identification information acquired by the program identification information acquisition means.

10. The television receiver according to claim 8, wherein the information acquisition means acquires desired program-related information by: (i) accessing an information server connected thereto in which program identification information and address information of program-related information are accumulated in association with each other, the information server being accessed by utilizing the program identification information acquired by the program identification information acquisition means; and (ii) accessing an information server connected thereto in which program-related information and address information of the program-related information are accumulated in association with each other, the information server being accessed by utilizing the address information of the program-related information acquired from the address server.

11. The television receiver according to claim 10, wherein the information display means displays, on the television display screen, the address information of the program-related information acquired from the address server before the information acquisition means accesses the information server.

12. The television receiver according to claim 8, wherein the program identification information is encoded information including (i) a channel and (ii) a date and time, on or at which a television program is broadcast.

13. The television receiver according to claim 12, wherein the program identification information is a G-code®.

14. The television receiver according to claim 8, wherein the program identification information is encoded information including (i) a broadcasting station and (ii) a date and time, from or at which a television program is broadcast.

15. A system in which information is provided from an information server to a television receiver, the system comprising:
   a television receiver including:
      television broadcast receiving means for obtaining a television program based on a received television signal and for displaying the obtained television program on a television display screen;
      numerical quantity acquisition means for acquiring, from one of the television signal and program list information that is acquired via the communication network, a numerical quantity of available program-related information related to a television program and acquirable via the communication network, the program list information being acquired from the television signal or via the communication network, such that the numerical quantity represents a specific number identifying a number of pieces of program-related information available and related to the television program;
      program identification information acquisition means for acquiring, from the program list information, program identification information for uniquely identifying a television program;
      numerical quantity display means for simultaneously displaying, for each television program of a plurality of television programs, a respective numerical quantity acquired by the numerical quantity acquisition means, as a numeric character, together with a title of each respective television program, each respective numerical quantity and the title of each respective television program being simultaneously displayed in a program list displayed on the television display screen, such that the displayed numeric character represents the specific number identifying the number of pieces of the program-related information available and related to each television program of the plurality of television programs;
      input means for accepting, from a user, a selection of a television program, of which program-related information is to be acquired;
      information acquisition means for acquiring, from an address server that (i) is connected to the information acquisition means via the communication network and (ii) accumulates address information of program-related information, address information only of the program-related information related to the television program selected by the user via the input means, and for acquiring the program-related information related to the television program selected by the user via the input means by utilizing the acquired address information; and
      information display means for displaying the program-related information acquired by the information acquisition means on the television display screen; and
   an information server connected to the television receiver, the information server (i) being operable to accumulate program identification information and program-related information in association with each other and (ii), when receiving the program identification information from the television receiver, transmit the program-related information corresponding to the received program identification information to the television receiver.

16. The system according to claim 15, wherein,
the program identification information acquisition means acquires, from the program list information, the program identification information with respect to the television program being displayed by the television broadcast receiving means.

17. The system according to claim 15,
wherein the address server accumulates program identification information and address information of program-related information in association with each other and, when receiving the program identification information from the television receiver, transmits the address information of the program-related information corresponding to the received program identification information to the television receiver, wherein the information server accumulates address information of program-related information, instead of program identification information, to be associated with the program-related information, and wherein the information acquisition means acquires desired program-related information by: accessing the address server by utilizing the program identification information acquired by the program identification information acquisition means; and accessing the information server by utilizing the address information of the program-related information acquired from the address server.

18. The television receiver according to claim 1, wherein, when the program list information includes program-related information for a selected television program, the numerical quantity display means automatically displays the numerical quantity acquired by the numerical quantity acquisition means to allow the user to automatically recognize a numerical quantity of address information available for the selected television program.

* * * * *